Patented Dec. 1, 1931

1,834,866

UNITED STATES PATENT OFFICE

WILHELM PUNGS, OF LUDWIGSHAFEN-ON-THE-RHINE, AND KARL BEHRINGER, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF SOFT PALE COLORED PRODUCTS OF WAXY NATURE

No Drawing. Application filed July 8, 1929, Serial No. 376,845, and in Germany July 12, 1928.

The present invention relates to the production of soft pale colored products of waxy nature.

The treatment of waxes such as Montan wax, beeswax and the like and also paraffin wax, or conversion products of the same, with gaseous oxidizing agents such as oxygen or gases containing the same at elevated temperatures for the purpose of oxidation or of purification from non-waxy matter is already known. In this manner, however, only more or less strongly colored products are often obtained, which usually require a further purifying treatment before they can be further employed.

We have now found that hard waxy materials such as paraffin wax, Montan wax, beeswax and the like and conversion products of the same are directly converted in good yield into almost colorless soft waxy products by treatment with gaseous oxidizing agents such as oxygen or gases containing the same at elevated temperatures when small quantities of acid reacting substances are added to the initial materials to be treated. For this purpose solutions of inorganic acids such as sulphuric acid, nitric acid, phosphoric acid, perchloric acid, and the like, or of their acid salts such as sodium bisulphate, mono sodium phosphate and the like, for example, are suitable. Organic acids may also be employed, for example, toluene sulphonic acid or the so-called "ansolvo acids" (see Schriften der Königsberger Gelehrten Gesellschaft, Vol. 5, Meerwein, "Über Ansolvosäuren und ihre Bedeutung" Deutsche Verlagsgesellschaft für Politik und Geschichte m. b. H., Berlin 1926). The term "ansolvo acids" defines complex compounds consisting of a salt and a compound capable of splitting off hydrogen-ions, such as acids, alcohols or water, in which complex compounds the salt is coordinatively combined with the radicle of the other compound and ionogenically combined with the hydrogen-ion split off, as for example in the ansolvo acids

[AlCl$_3$.C$_2$H$_5$O]H,   [ZNCl$_2$.(CH$_3$COO)$_2$]H$_2$ or [ZnX$_2$.(C$_2$H$_5$O)$_2$]H$_2$, (in which X may be the anion of an organic or inorganic acid, such as Cl', Br', CH$_3$COO' or C$_3$H$_7$COO'), which shew an acid reaction. The compound

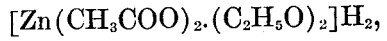

for example, can be obtained by dissolving zinc acetate in ethyl alcohol. Also similar compounds of aluminium, boron, antimony or tin may be employed for example [Al(OR)$_4$]H, [B(OR)$_4$]H, [Sb(OR)$_4$]H or [Sn(OR)$_6$]H$_2$ in which formulæ R denotes any alkyl radicle such as CH$_3$, C$_2$H$_5$ and the like.

The quantity employed of the aforesaid acid substances is generally between 0.01 and 0.5 per cent by weight of the initial wax and usually from 0.1 to 0.2 per cent are sufficient to produce the desired effect. The substances may be added as such or in the form of dispersions thereof for example as stated above in the form of solutions thereof, which may be prepared with water or with organic solvents or mixtures of both according to the nature of substance employed. Besides the said agents also other substances accelerating the reaction can be added, such as barium cinnamate, manganese acetyl acetonate and the like.

The temperature during the process is kept generally between about 120° and about 220° C. and good results are usually obtained by working between about 140° C. and 200° C. Depending on the temperature and the duration of the treatment a bleaching effect may be combined with physical changes of the initial materials, and even with a chemical change, such as a more or less intense oxidation, which latter occurs for example at the upper limits of the aforesaid range of temperatures; but usually the desired effect consists in physically altering the initial materials, so that medium temperatures and a rather short treatment are preferred. Thus for example paraffin wax can be oxidized and simultaneously bleached and kept pale in the aforesaid manner in contrast to the hitherto known processes of oxidizing paraffin wax which allow of producing only more or less brown colored oxidation products. Furthermore Montan wax and the like may be bleached and/or softened as well as conversion products of Montan wax, such as insufficiently bleached Montan wax, or esters or salts of bleached Montan wax or mixtures of both, or any other conversion product of such bleached wax in which the carboxylic groups of the acids present are converted in the CO-group may be softened in accordance with the present invention.

Processes for bleaching Montan wax and for the further conversion of such bleached Montan wax have been described for example in one of the present applicants' applications Ser. Nos. 252,037 filed February 4, 1928, 254,604 filed February 15, 1928, and in applicants' applications Ser. Nos. 352,903 and 352,904 filed April 5, 1929.

The following examples will further illustrate the nature of the invention but the invention is not restricted to these examples.

*Example 1*

100 kilograms of paraffin wax and 0.1 kilogram of 45 per cent sulphuric acid are heated in a vessel fitted with a device which causes a fine distribution of gas passed through the same such as fillers with a large superficial area or sieves with fine pores. Air is passed through at from 160° to 170° centigrade until the reaction commences and the temperature is then allowed to fall to about 140° centigrade and air passed through for further 2½ hours at this temperature. An almost colorless reaction product is obtained which is semi-solid at room temperature, which product has an acid value of from 90 to 100 and a saponification value of from 190 to 210, and which is free from the unpleasant smell of lower fatty acids. It may be readily saponified and yields a very pale soap solution.

In order to commence the reaction more easily it is advantageous to add a small quantity of the reaction product to the paraffin wax.

Instead of sulphuric acid an equal quantity of any of the above described alternative substances may be employed with the same result.

*Example 2*

A product resembling beeswax in its physical properties obtained by heating 220 kilograms of cocoanut fatty acids with 150 kilograms of ethylene glycol together with 1 kilogram of 40 per cent sulphuric acid for 1 hour to from 120° to 130° centigrade, adding 1000 kilograms of a bleached Montan wax, 100 kilograms of stearin and 40 kilograms of wool fat and heating the mixture for further 3 hours to the same temperature, is, after the addition of 0.1 per cent of 50 per cent sulphuric acid and 0.1 per cent of barium cinnamate, treated with air at 140° centigrade for ¼ hour. The original more or less yellow colored product is converted into a very pale product without considerable change in its other properties.

*Example 3*

100 parts of a Montan wax which has been bleached with 175 parts of chromic acid in about 2700 parts of a 40 per cent sulphuric acid at about 110° centigrade are intimately mixed with 0.1 part of oxalic acid and then heated preferably in a cylindric vessel to 180° C. and a finely divided current of air is passed through the mass for about one hour. The resulting product is after cooling considerably softer than the initial material and can be kneaded by the hand.

In the place of the aforesaid initial material a Montan wax which has been bleached in the aforesaid manner but with 140 parts of chromic acid only can be treated in the same manner a product being obtained which, as well as that mentioned above, may find useful application for aqueous boot polishes or similar emulsions.

*Example 4*

100 parts of a Montan wax which has been bleached in either of the methods referred to in the foregoing example and then, almost completely esterified with glycerol is treated with air in the manner described in the foregoing example. A practically colorless product is obtained which can be kneaded by the hand and constitutes a valuable substitute for bees-wax. By extending the treatment to one and a half hours a product resembling Japan wax in its physical properties is obtained.

*Example 5*

A mixture of 10 parts of paraffin wax and 100 parts of Montan wax which has been bleached and subsequently esterified with ethylene glycol, is treated at about 180° C. with a current of air in the presence of 0.3 part of the ansolvo acid obtainable from zinc chloride and glacial acetic acid for about a quarter of an hour whereupon 20 parts of paraffin wax and 5 parts of castor oil are added and blowing with air is continued for a further half an hour. The physical properties of the product obtained are nearly the same as those obtained according to Example 4 but it is more elastic than the latter.

What we claim is:—

1. The process for the production of pale colored soft products of waxy nature which comprises heating a hard waxy material in the presence of a small quantity of an acid reacting substance to a temperature between about 120° C and 220° C., while passing a current of a gas containing free oxygen through the reaction mixture.

2. The process for the production of pale colored soft products of waxy nature which comprises heating a hard waxy material in the presence of from 0.01 to 0.5 per cent its weight of an acid reacting substance to a temperature between about 120° C. and 220° C., while passing a current of a gas containing free oxygen through the reaction mixture.

3. The process for the production of pale colored soft products of waxy nature which comprises heating a hard waxy material in the presence of a small quantity of an acid to a temperature between about 120° C. and 220° C., while passing a current of a gas containing free oxygen through the reaction mixture.

4. The process for the production of pale colored soft products of waxy nature which comprises heating a hard waxy material in the presence of from 0.01 to 0.5 per cent its weight of an acid reacting substance to a temperature between about 120° C. and 220° C., while passing a current of air through the reaction mixture.

5. The process for the production of pale colored soft products of waxy nature which comprises heating a hard wax in the presence of from 0.01 to 0.5 per cent its weight of an acid reacting substance to a temperature between about 120° C. and 220° C., while passing a current of air through the reaction mixture.

6. The process for the production of pale colored soft products of waxy nature which comprises heating a hard Montan wax in the presence of from 0.01 to 0.5 per cent its weight of an acid reacting substance to a temperature between about 120° C. and 220° C., while passing a current of air through the reaction mixture.

7. The process for the production of pale colored soft products of waxy nature which comprises heating a hard Montan wax which has been bleached, in the presence of from 0.01 to 0.5 per cent its weight of an acid reacting substance to a temperature between about 120° C. and 220° C., while passing a current of air through the reaction mixture.

8. The process for the production of pale colored soft products of waxy nature which comprises heating a hard Montan wax which has been bleached and in which the carboxyl groups of the acids present have been converted into other groups still containing the CO-group, in the presence of from 0.01 to 0.5 per cent its weight of an acid reacting substance to a temperature between about 120° C. and 220° C., while passing a current of air through the reaction mixture.

9. The process for the production of pale colored soft products of waxy nature which comprises heating a hard wax in the presence of from 0.01 to 0.5 per cent its weight of an acid to a temperature between about 120° C. and 220° C., while passing a current of air through the reaction mixture.

10. The process for the production of pale colored soft products of waxy nature which comprises heating a hard Montan wax in the presence of from 0.01 to 0.5 per cent its weight of an acid to a temperature between about 120° C. and 220° C., while passing a current of air through the reaction mixture.

11. The process for the production of pale colored soft products of waxy nature which comprises heating a hard Montan wax which has been bleached, in the presence of from 0.01 to 0.5 per cent its weight of an acid to a temperature between about 120° C. and 220° C., while passing a current of air through the reaction mixture.

12. The process for the production of pale colored soft products of waxy nature which comprises heating a hard Montan wax which has been bleached and in which the carboxyl groups of the acids present have been converted into other groups still containing the CO-group, in the presence of from 0.01 to 0.5 per cent its weight of an acid to a temperature between about 120° C. and 220° C., while passing a current of air through the reaction mixture.

13. The process for the production of pale colored soft products of waxy nature which comprises heating a hard wax in the presence of from 0.01 to 0.5 per cent its weight of an aqueous sulphuric acid of about 45 per cent strength to a temperature between about 120° C. and 220° C., while passing a current of air through the reaction mixture.

14. The process for the production of pale colored soft products of waxy nature which comprises heating a Montan wax in the presence of from 0.01 to 0.5 per cent its weight of aqueous oxalic acid of about 50 per cent strength to a temperature between about 120° C. and 220° C., while passing a current of air through the reaction mixture.

15. The process for the production of pale colored soft products of waxy nature which comprises heating a Montan wax in the presence of from 0.01 to 0.5 per cent its weight of the ansolvo acid, obtainable from zinc chloride and glacial acetic acid, to about 180° C., while passing a current of air through the reaction mixture.

In testimony whereof we have hereunto set our hands.

WILHELM PUNGS.
KARL BEHRINGER.